United States Patent
Gerö et al.

(10) Patent No.: US 11,907,763 B2
(45) Date of Patent: Feb. 20, 2024

(54) TECHNIQUE FOR DETERMINING CLOUD COMPUTING DEPLOYMENT MODIFICATIONS FOR SERVERLESS APPLICATIONS

(71) Applicant: Telefonaktiebolaget LM Ericsson (publ), Stockholm (SE)

(72) Inventors: Balázs Peter Gerö, Budapest (HU); András Kern, Budapest (HU); Dávid Jocha, Budapest (HU); Bence Formanek, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 375 days.

(21) Appl. No.: 17/436,772

(22) PCT Filed: Apr. 12, 2019

(86) PCT No.: PCT/EP2019/059375
§ 371 (c)(1),
(2) Date: Sep. 7, 2021

(87) PCT Pub. No.: WO2020/207595
PCT Pub. Date: Oct. 15, 2020

(65) Prior Publication Data
US 2022/0188164 A1 Jun. 16, 2022

(51) Int. Cl.
*G06F 9/50* (2006.01)
(52) U.S. Cl.
CPC .......... *G06F 9/5027* (2013.01); *G06F 9/5072* (2013.01)
(58) Field of Classification Search
None
See application file for complete search history.

(56) References Cited

U.S. PATENT DOCUMENTS 10,671,360 B1\* 6/2020 Todd ..................... G06F 9/5072
2018/0300173 A1\* 10/2018 Shimamura ........... G06F 9/5066
(Continued)

FOREIGN PATENT DOCUMENTS

WO 2013184140 A1 12/2013
WO 2020114586 A1 6/2020

OTHER PUBLICATIONS

Czentye et al.; "Optimizing Latency Sensitive Applications for Amazon's Public Cloud Platform"; 2019 IEEE; (Czentye_2019.pdf; pp. 1-7) (Year: 2019).\*

(Continued)

*Primary Examiner* — Hiren P Patel
(74) *Attorney, Agent, or Firm* — Murphy, Bilak & Homiller, PLLC

(57) ABSTRACT

A technique for dynamically determining a modification of an initial cloud computing deployment (CCD) of a serverless application with multiple application functions is described. The multiple application functions in the initial CCD are grouped into one or more deployment artifacts each comprising at least one application function, wherein each deployment artifact is associated with a dedicated cloud computing platform type selected from FaaS and CaaS. An apparatus of the present disclosure is configured to obtain at least one requirement for the serverless application or its deployment, and to obtain an application model of the serverless application. The apparatus is further configured to determine, based on the application model and the at least one requirement, a modified CCD of the serverless application, wherein the modified CCD comprises at least one of a modified grouping of the multiple application functions into one or more deployment artifacts and a modified association of a particular deployment artifact with a dedi- (Continued)

cated cloud computing platform type selected from at least FaaS and CaaS.

19 Claims, 7 Drawing Sheets

(56) References Cited

U.S. PATENT DOCUMENTS

| | | | |
|---|---|---|---|
| 2018/0349121 A1 | 12/2018 | Bagarolo et al. | |
| 2018/0349168 A1 | 12/2018 | Ahmed | |
| 2019/0044806 A1 | 2/2019 | Sedayao | |
| 2019/0363954 A1* | 11/2019 | Sharma | G06F 9/5038 |
| 2020/0133738 A1* | 4/2020 | Junior | G06F 9/5077 |
| 2020/0218516 A1* | 7/2020 | Hari Krishnan | G06F 9/45529 |
| 2020/0225983 A1* | 7/2020 | Jung | G06F 9/5027 |
| 2021/0149742 A1* | 5/2021 | Turanyi | H04L 67/51 |
| 2021/0263779 A1* | 8/2021 | Haghighat | G06F 21/78 |

OTHER PUBLICATIONS

Wurster et al.; "Modeling and Automated Deployment of Serverless Applications using TOSCA"; 2018 IEEE 11th International Conference on Service-Oriented Computing and Applications; (Wurster_2018.pdf; pp. 1-8) (Year: 2018).*

"Amazon CloudWatch", https://aws.amazon.com/cloudwatch/ 12/, Dec. 20, 2018, pp. 1-12.

"Amazon S3 Analytics—Storage Class Analysis", https://docs.aws.amazon.com/AmazonS3/latest/dev/analytics-storage-class.html, Dec. 20, 2018, pp. 1-10.

"AW Lambda", Serverless Compute—Amazon Web Services; https://aws.amazon.com/lambda/, Dec. 20, 2018, pp. 1-12.

"AWS Support—Trusted Advisor", https://aws.amazon.com/premiumsupport/trustedadvisor/, Dec. 20, 2018, pp. 1-6.

"Open Source Serverless Cloud Platform", Apache OpenWhisk is a serverless, open source cloud platform; http://openwhisk.incubator.apache.org, Dec. 20, 2018, pp. 1-7.

"What is Densify?", Public Cloud Optimization Service; An Analytics Service that Makes Your Cloud Self-Optimizing | Densify; https://www.densify.com/service, Dec. 20, 2018, pp. 1-7.

"Serverless computing", https://en.wikipedia.org/w/index.php?title=Serverless_computing&oldid=890762195, Apr. 3, 2019, pp. 1-7.

Davé, Hemang, "Function as a Service (FaaS), Server-less environments and IBM Cloud Private", https://www.linkedin.com/pulse/function-service-faas-server-less-environments-ibm-cloud-hemang-dave, Nov. 29, 2017, pp. 1-6.

* cited by examiner

TECHNIQUE FOR DETERMINING CLOUD COMPUTING DEPLOYMENT MODIFICATIONS FOR SERVERLESS APPLICATIONS

TECHNICAL FIELD

The present disclosure relates to cloud computing. In more detail, the disclosure relates to determining a modification of a cloud computing deployment of a serverless application. The disclosure may be implemented in the form of an apparatus, a cloud computing system, a method, and a computer program product.

BACKGROUND

Cloud computing has become a widespread solution to a plethora of computing needs. There are many approaches to cloud computing, and a few examples will in the following be discussed in greater detail.

Platform as a Service (PaaS) provides a cloud computing platform allowing users to develop, run, and manage applications without the complexity of building and maintaining the infrastructure. Amazon Web Services (AWS) Beanstalk is one example of a PaaS solution.

Container as a Service (CaaS), such as AWS ECS, is a form of virtualization in which an application with all its dependencies is packed in a container that is easily portable across systems. CaaS solutions provide a high degree of control and flexibility while being vendor-agnostic. It is not uncommon to split up a monolithic application into separate "microservices" using separate containers.

Function as a Service (FaaS) provides a platform allowing users to develop, run, and manage different application functionalities, or functions, without the complexity of building and maintaining the underlying infrastructure. The functions can be triggered in an event-based manner. As such, the whole software logic can easily be implemented as functions and events. FaaS platforms are efficient in scenarios that do not justify continuously running containers. Due to their simplicity, FaaS platforms are sometimes also referred to as "serverless" platforms. FaaS platforms are auto-scalable, which means that resource billing can be based on the real resource consumption, and not on previously declared resource needs. Examples of FaaS solutions include Amazon Web Services (AWS) Lambda.

CaaS and FaaS solutions have their individual advantages and disadvantages. As an example, containers are helpful if flexibility is required to install and use software with different version requirements (e.g., different software stacks). However, it is not an easy task to configure a CaaS orchestration platform to automatically handle workload fluctuations. In this regard, the process of detecting workload changes and instantiating new (or removing old) containers cannot be performed instantaneous, so there will always be runtime costs. FaaS solutions, on the other hand, provide a higher degree of flexibility when it comes to the instantaneous detection and handling of workload fluctuations. On the other hand, FaaS solutions are not easy to implement for complex applications with many interrelated functions.

SUMMARY

There is a need for improving the deployment of serverless applications.

According to one aspect, an apparatus for dynamically determining a modification of an initial cloud computing deployment (CCD) of a serverless application with multiple application functions is provided, wherein the multiple application functions in the initial CCD are grouped into one or more deployment artifacts each comprising at least one application function, wherein each deployment artifact is associated with a dedicated cloud computing platform type selected from FaaS and CaaS. The apparatus is configured to obtain at least one requirement for the serverless application or its deployment, and to obtain an application model of the serverless application. The apparatus is further configured to determine, based on the application model and the at least one requirement, a modified CCD of the serverless application, wherein the modified CCD comprises at least one of a modified grouping of the multiple application functions into one or more deployment artifacts and a modified association of a particular deployment artifact with a dedicated cloud computing platform type selected from at least FaaS and CaaS.

In some variants, at least one of the initial CCD and the modified CCD comprises a first deployment artifact associated with the platform type FaaS and a second deployment artifact associated with the platform type CaaS. In such variants, the CCD of the serverless can be optimized across FaaS and CaaS platform types. The platform type CaaS may comprise a container including a Platform as a Service (PaaS) artifact.

The apparatus is configured to obtain the application model by at least one of analyzing code of the serverless application and analyzing one or more measurements taken during runtime of the serverless application. The apparatus may obtain at least some aspects of the application model via user input.

The application model may define an execution workflow of the serverless application. Alternatively, or in addition, the application model may define accesses of individual items of externalized data by individual application functions. As an example, the application model may list items of externalized data for each application function. The application model may also indicate if the same item of externalized data is accessed by two or more application functions. The items of externalized data may be internal to a particular deployment artifact or external to a particular deployment artifact. The modified CCD may result in an association of deployment artifacts with externalized data that is different from the corresponding association of the initial CCD.

The apparatus may be configured to express one or more of the application model and the at least one requirement as a set of equations. In such an implementation, the modified CCD may be determined using an equation solver algorithm. Additionally, or in the alternative, the apparatus may be configured to derive, on the basis of a true subset of the application functions, an intermediate CCD as a partial solution that fulfills the at least one requirement. In such an implementation, the modified CCD may be determined by adding at least one application function to the true subset such that the at least one requirement remains fulfilled. In the above implementations, the requirement may thus be expressed as a constraint that has to be fulfilled by the modified CCD (and, optionally, by any CCD of the serverless application, including the initial CCS).

The apparatus may be configured to obtain at least one measurement taken for the serverless application during runtime thereof in its initial CCD. In such a case, the modified CCD may be determined based on or responsive to the at least one measurement. In the first case, the at least one of the requirement and the application model may be obtained based on a processing of the at least one measurement. In the second case, the at least one measurement may trigger the determination of the modified CCD (e.g., because the at least one measurement indicates that a performance condition is violated).

The at least one measurement may relate to an execution of individual application functions. Alternatively, or in addition, the at least one measurement may relate to an externalized data access by individual application functions or deployment artifacts. In the first case, the execution of the individual application functions may be measured per function or per function type in regard to one or more of function duration, function call rate, and function inbound bandwidth. In the second case, the externalized data access may be measured per function, per function type or per deployment artifact in regard to one or more of data access rate, data access bandwidth, and data access duration.

The modified CCD may be a reaction to at least one of a change in cloud computing hardware and a change in data input characteristics since creation of the initial CCD. Such a change may be detected by the apparatus, for example based on the at least one measurement, and then trigger determination of the modified CCD.

The at least one requirement may be expressed in many ways, for example as a constraint or a target. In some variants, the at least one requirement relates to performance of the serverless application. For example, the performance, and thus the requirement, may expressed (e.g., as an application performance target) by one or more of critical path latency, a function restoration parameter and total required hardware resources. In these variants, the at least one requirement may be set by a user or creator of the serverless application. In other variants, the at least one requirement may result (e.g., as an application characteristics constraint) from the cloud computing platform type that is to be associated with a deployment artifact. In the latter variants, the at least one requirement may be set by a platform operator of the target platform type (e.g., FaaS or CaaS). In some cases, one requirement resulting from the cloud computing platform type may be cost-based. Each cloud computing platform type may have a dedicated cost model and the requirement may define that the deployment costs of the serverless application are to be optimized (e.g., minimized).

The apparatus may be configured to trigger installation of the modified cloud computing deployment. During installation, the deployment artifacts (i.e., the group of application functions) may be deployed on the associated platform type. As an example, application functions to be deployed together as a deployment artifact on an FaaS platform type may be collected into a file having a format that combines and optionally compresses multiple files (e.g., in a .zip or .tar file). As a further example, application functions to be deployed together as a deployment artifact on a CaaS platform type (i.e., to be deployed in a container) may be compiled as an image (e.g., as a Docker image).

The apparatus may be configured to package a group of one or more application functions into a deployment artifact for the modified CCD. The apparatus may further be configured to update one or more Application Programming Interface (API) calls associated with the application functions in that deployment artifact. Still further, the apparatus may be configured to link the deployment artifact resulting from the packing with one or more libraries that provide at least one of group internal or group external function invocations and group internal or group external data accesses.

Also, the apparatus may be configured to generate a life cycle management workflow based on the application model and the modified CCD. Exemplary workflows comprise an initialization workflow, an install workflow, an uninstall workflow, a start workflow, and a stop workflow.

Also provided is a cloud computing system comprising the apparatus presented herein and cloud computing resources configured for a deployment of the serverless application in accordance with at least one of the initial CCD and the modified CCD.

A further aspect of the present disclosure relates to a method of dynamically determining a modification of an initial CC, of a serverless application with multiple application functions, the multiple application functions in the initial CCD being grouped into one or more deployment artifacts each comprising at least one application function, wherein each deployment artifact is associated with a dedicated cloud computing platform type selected from at least FaaS and CaaS. The method comprises obtaining at least one requirement for the serverless application or its deployment, and obtaining an application model of the serverless application. The method further comprises determining, based on the application model and the at least one requirement, a modified CCD of the serverless application, wherein the modified CCD comprises at least one of a modified grouping of the multiple application functions into one or more deployment artifacts and a modified association of a particular deployment artifact with a dedicated cloud computing platform type selected from at least FaaS and CaaS.

The method may be performed by the apparatus as presented herein. As such, the method may comprise further steps as generally described herein.

Also provided is a computer program product comprising program code portions for performing the steps of any of the method aspects presented herein when executed by one or more processors. The computer program product may be stored on a computer-readable recording medium.

Still further, a cloud computing system configured to perform the method aspects as presented herein is provided.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

Figure 1:
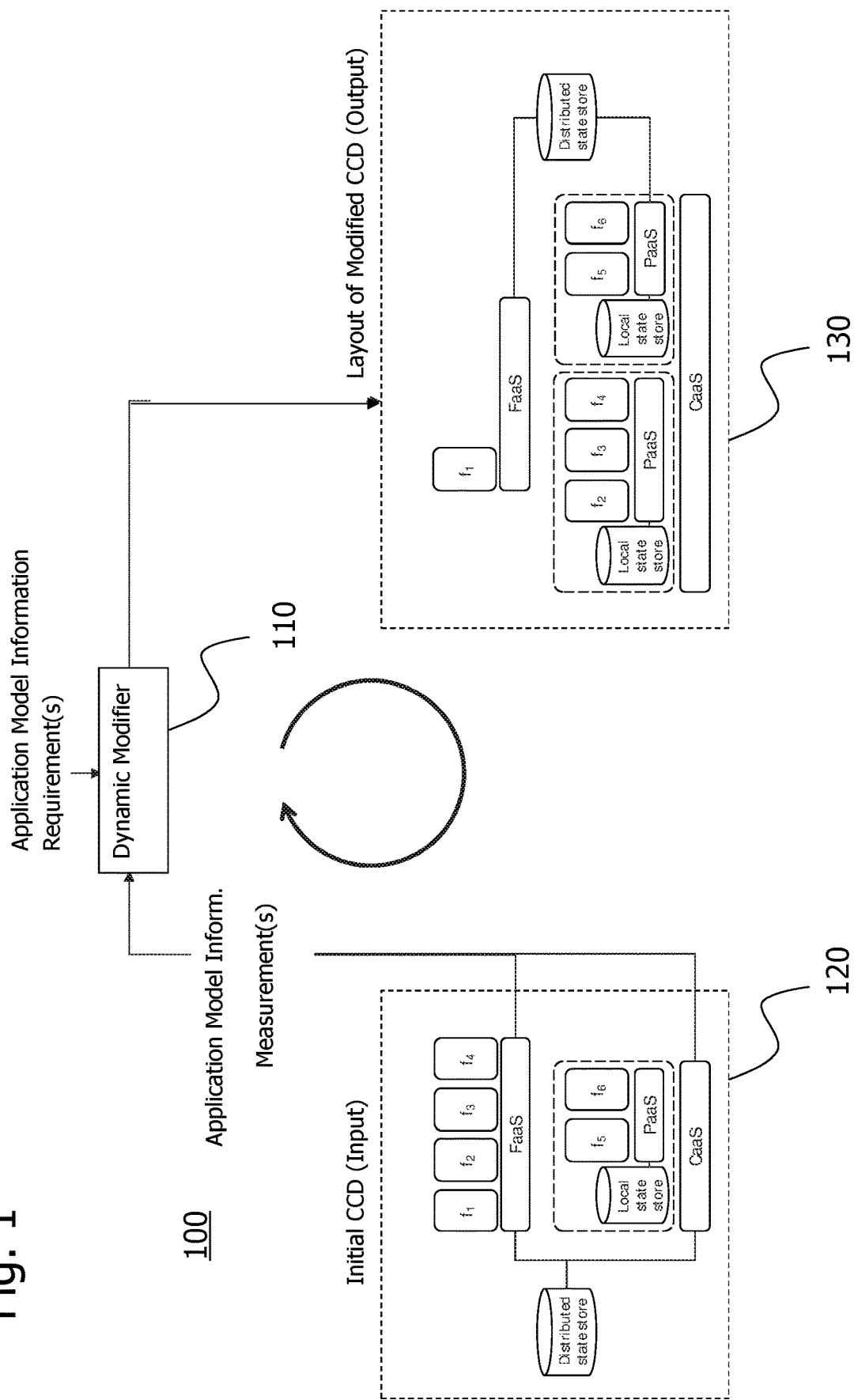
FIG. 1 is a schematic diagram illustrating a cloud computing system embodiment of the present disclosure.

In the following description, for purposes of explanation and not limitation, specific details are set forth in order to provide a thorough understanding of the present disclosure.

It will be apparent to one skilled in the art that the present disclosure may be practiced in other embodiments that depart from these specific details.

While, for example, the following description focuses on an exemplary cloud computing system configurations, the present disclosure is not limited in this regard. Moreover, while optimization across FaaS and CaaS platforms will be explained with reference to exemplary cloud computing deployments of a serverless application, it will be readily apparent that other types of cloud computing deployments may be implemented as well.

Those skilled in the art will further appreciate that the steps, services and functions explained herein may be implemented using individual hardware circuits, using software functioning in conjunction with a programmed microprocessor or general purpose computer, using one or more Application Specific Integrated Circuits (ASICs) and/or using one or more Digital Signal Processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

FIG. 1 illustrates an embodiment of a cloud computing system 100 in which the present disclosure can be implemented. As shown in FIG. 1, the cloud computing system 100 comprises a dynamic modification apparatus 102, also called dynamic modifier hereinafter. The cloud computing system 100 further comprises cloud computing resources configured for implementing a serverless application in different cloud computing deployments (CCDs) 120, 130. In more detail, FIG. 1 illustrates an initial CCD 120 and a modified CCD 130 of the serverless application. The modification apparatus 110 is configured to determine, based on various items of input information, the modified CCD 130 of the serverless application as output. The modified CCD 130 will in certain aspects be improved, or optimized, compared to the initial CCD 120 of the serverless application. The modification apparatus 110 may be operated in an iterative manner, meaning that the modified CCD 130 could form the input ("initial") CCD in a further iteration of a modification procedure.

The serverless application underlying the initial CCD 120 and the modified CCD 130 is written to be executed on a so-called serverless architecture. This means, inter alia, that the serverless application comprises multiple application functions exemplarily denoted $f_1$ to $f_6$ in the embodiment of FIG. 1. The application functions $f_1$ to $f_6$ can be triggered, or invoked, independently and in an event-based manner. FaaS provides a platform type allowing developers to execute code in response to events without the complexity of building and maintaining the platform infrastructure. Serverless applications have for this reason traditionally been run on FaaS platforms. It has, however, been found that it will often be beneficial to dynamically distribute the application functions across FaaS and CaaS platform types, as will now be explained in greater detail.

In the CCDs 120, 130, the application functions $f_1$ to $f_6$ are grouped into multiple deployment artifacts, or deployment units. Each deployment artifact is associated with a dedicated cloud computing platform type selected from at least FaaS and CaaS.

In the embodiment of FIG. 1 and with reference to the initial CCD 120, application functions $f_1$ to $f_4$ of the serverless application are grouped to a first deployment artifact associated with an FaaS platform type, whereas application functions $f_5$ and $f_6$ are grouped to a second deployment artifact associated with a CaaS platform type. In more detail, application functions $f_5$ and $f_6$ are comprised in a container and on top of a PaaS artifact. The container also includes a local state store. The application functions $f_1$ to $f_6$ of the serverless application are thus distributed across FaaS and CaaS platform types, and the distribution as such is maintained by the modified CCD 130. However, as illustrated in FIG. 1, in the modified CCD 130 only application function $f_1$ of the serverless application remains in a first deployment artifact associated with an FaaS platform type, whereas application functions $f_2$ to $f_4$ have been grouped to a new second deployment artifact associated with a CaaS platform type in a first container, and application functions $f_5$ and $f_6$ remain grouped to a third deployment artifact also associated with a CaaS platform type in a second container. Each of the two CCDs 120, 130 comprises a distributed state store accessible from both the FaaS and the CaaS platform types. The distributed state store may store externalized data that needs to be accessed by different application functions $f_1$ to $f_6$.

As illustrated in FIG. 1, the dynamic modifier 110 determines the modified CCD 130 on the basis of a set of input information obtained in various ways. One item of input information are requirements that may be specified by a user or programmer of the serverless application and by operators of the FaaS and CaaS platforms. Another item of input information relates to an application model of the serverless application. This application model may be indicative of one or both of an execution workflow of the serverless application and of accesses of externalized data by the application functions $f_1$ to $f_6$.

Figure 2B:
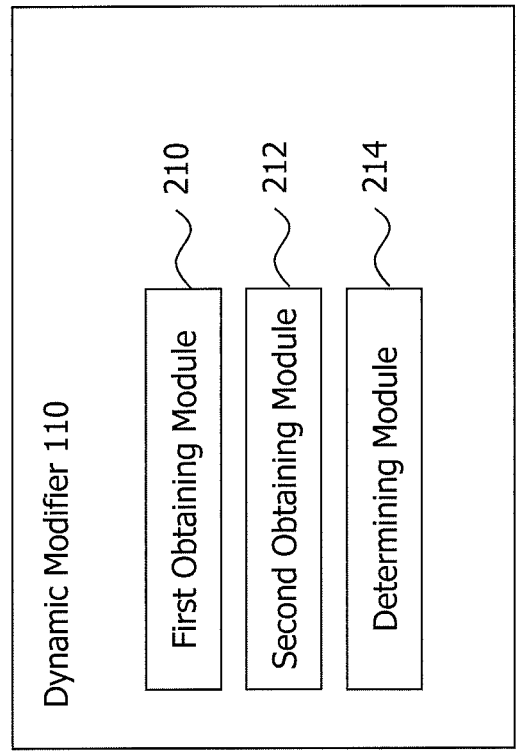
FIGS. 2A, 2B are schematic block diagrams illustrating two dynamic modification apparatus embodiments of the present disclosure.
Figure 2A:
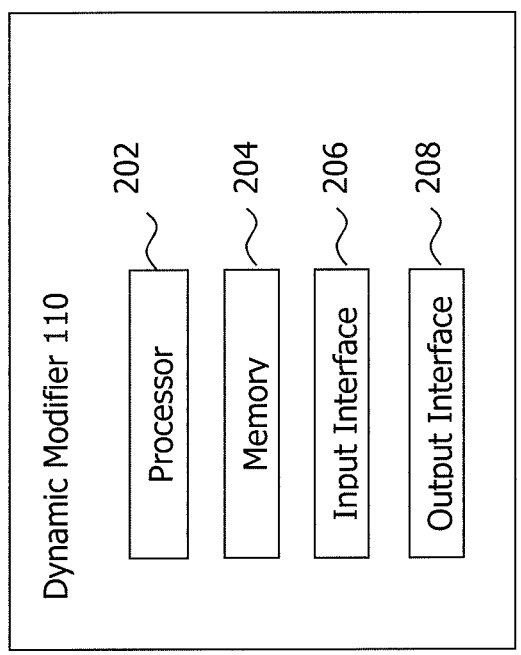

FIGS. 2A and 2B illustrate two embodiments of the dynamic modifier 110 of FIG. 1. In the embodiment illustrated in FIG. 2A, the dynamic modifier 110 comprises a processor 202 and a memory 204 coupled to the processor 202. The dynamic modifier 110 further comprises an optional input interface 206 and an optional output interface 208. The memory 204 stores program code that controls operation of the processor 202.

The processor 202 is configured to obtain at least one requirement for the serverless application or its deployment (e.g., via the input interface 206), and to obtain an application model of the serverless application (e.g., also via the input interface 206). The processor 202 is further configured to determine, based on the application model and the at least one requirement, the modified CCD 130 of the serverless application. In the embodiment illustrated in FIG. 1, the modified CCD 130 comprises—in relation to the initial CCD 120—a modified grouping of the multiple application functions $f_1$ to $f_6$ into different deployment artifacts. In other realizations, the modified CCD 130 could comprise a modified association of a particular deployment artifact of the initial CCD 120 with a dedicated cloud computing platform type selected from at least FaaS and CaaS. As an example, the FaaS-based deployment artifact with application functions $f_1$ to $f_4$ of the initial CCD 120 could have been deployed on the CaaS platform in the modified CCD 130. Of course, these aspects can be combined in that one or more of the application functions $f_1$ to $f_6$ are not just affected by a re-grouping, but will also be hosted on a different platform type in the modified CCD 130, as illustrated for application functions $f_2$ to $f_4$ in FIG. 1

FIG. 2B shows an embodiment in which the dynamic modifier 110 is implemented in a modular configuration. As shown in FIG. 2B, the dynamic modifier 110 comprises a first obtaining module 210 configured to obtain at least one requirement for the serverless application or its deployment, and a second obtaining module 212 configured to obtain an application model of the serverless application. The dynamic modifier 110 further comprises a determining module 214 configured to determine, based on the application model and the at least one requirement, a modified CCD of the serverless application, wherein the modified CCD comprises at least one of a modified grouping of the multiple application functions into one or more deployment artifacts and a modified association of a particular deployment artifact with a dedicated cloud computing platform type selected from at least FaaS and CaaS.

Figure 3:
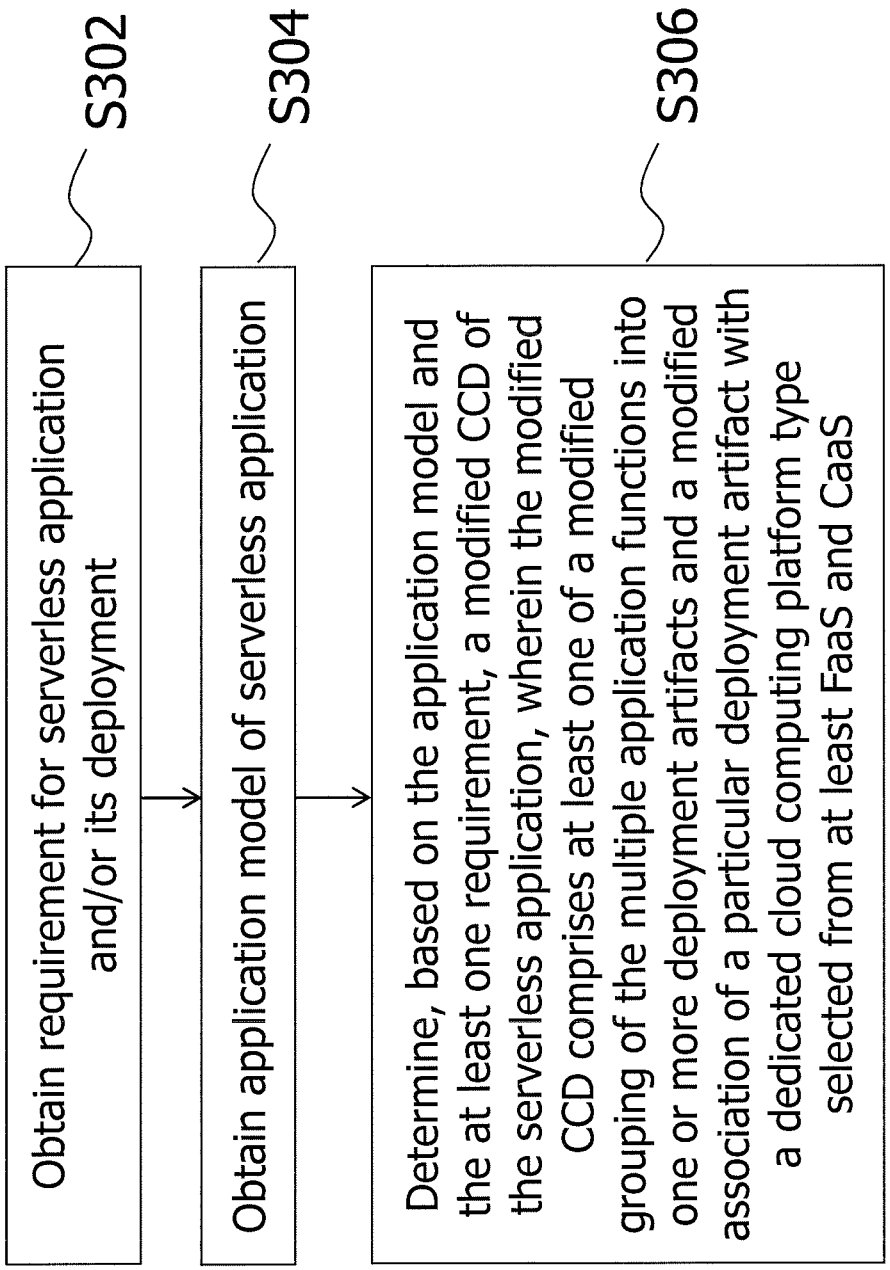
FIG. 3 is a flow diagram illustrating a dynamic modification method embodiment of the present disclosure.

FIG. 3 illustrates in a flow diagram 300 a method embodiment for dynamically determining a modification of an initial CCD of a serverless application with multiple application functions, wherein the multiple application functions in the initial CCD are grouped into one or more deployment artifacts each comprising at least one application function, wherein each deployment artifact is associated with a dedicated cloud computing platform type selected from FaaS and CaaS. The method embodiment of FIG. 3 may be performed by the dynamic modifier 110 discussed above in the context of FIGS. 1, 2A and 2B.

In step S302, the dynamic modifier 110 obtains at least one requirement for the serverless application or its deployment. As illustrated in FIG. 1, the requirement may be obtained via a user input. In some variants, the at least one requirement relates to performance of the serverless application. In these variants, the at least one requirement may be set by a user or creator of the serverless application. In other variants, the at least one requirement may result from the cloud computing platform type that is to be associated with a deployment artifact. In the latter variants, the at least one requirement may be set by a platform operator of the target platform type (e.g., FaaS or CaaS). All these variants can of course be combined in multiple requirements.

In step S304, the dynamic modifier 110 obtains an application model of the serverless application. Step S304 may be performed in any order relative to step S302. The application model obtained in step 304 is indicative of an execution workflow of the serverless application (e.g., in regard to invocation of the application functions $f_1$ to $f_6$) and of accesses of externalized data by the application functions $f_1$ to $f_6$. Information pertaining to the application model may be obtained via user input to the dynamic modifier 110. Alternatively, or in addition, the dynamic modifier 110 may itself derive the application model (e.g., by analyzing program code of the serverless application or by analyzing measurements taken during runtime of the serverless application in the initial CCD 120).

In step S306, the dynamic modifier 110 determines, based on the application model and the at least one requirement, and optionally based on information pertaining to the initial CCD 120 (e.g., runtime measurements), the modified CCD 130 of the serverless application. Step S306 may be performed in various ways. For example, the application model and the at least one requirement can be expressed as a set of equations, and the modified CCD 130 may be determined using an equation solver algorithm. In another variant, the dynamic modifier 110 derives, on the basis of a true subset of the application functions, an intermediate CCD as a partial solution that fulfills the at least one requirement. The modified CCD 130 will then be determined by adding at least one application function to the true subset such that the at least one requirement remains fulfilled.

Figure 4:
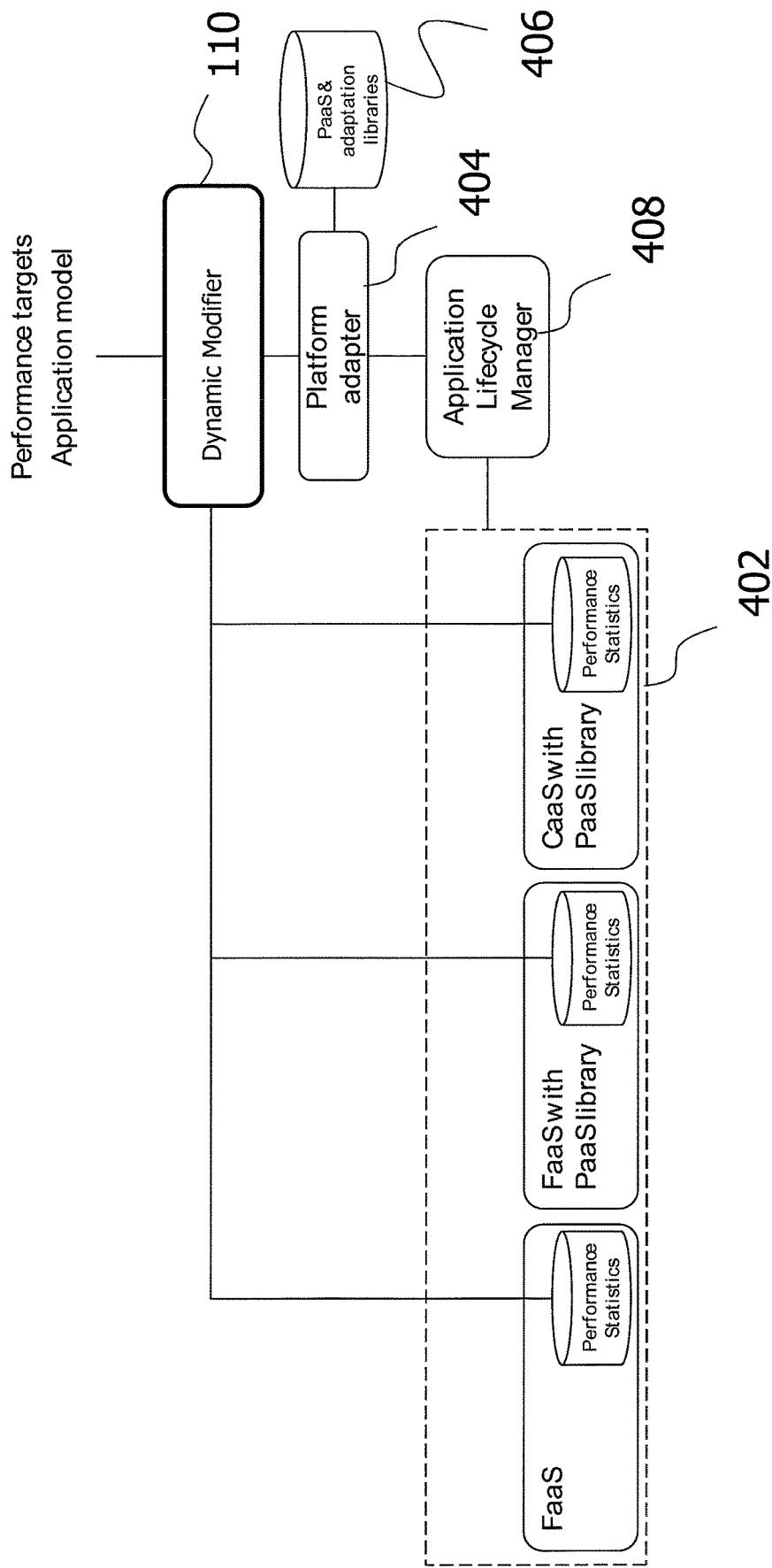
FIG. 4 is a schematic diagram illustrating a further cloud computing system embodiment of the present disclosure.

FIG. 4 shows additional details of the cloud computing system 100 of FIG. 1. The key component remains the dynamic modifier 110. An exemplary runtime environment 402 in which the serverless application can be deployed (as initial CCD 120 or modified CCD 130, see FIG. 1) includes, for example, an FaaS platform, a library-based PaaS operated for example as containers (CaaS with PaaS library) or application functions grouped together to a compound FaaS platform function by using a library component within the compound FaaS function (FaaS with PaaS library). For each of these platform types (e.g., for each associated deployment artifact of a given CCD 120, 130), performance statistics are stored. The performance statistics are based on measurements performed during runtime.

Still referring to FIG. 4, information from the runtime environment 402 that pertain to the initial CCD 120, in particular the measured performance statistics, are provided to the dynamic modifier 110. Moreover, the dynamic modifier 110 also obtains the application model of serverless application and requirements in the form of performance targets of the serverless application. Based on this input, the dynamic modifier 110 determines the modified CCD 130, as described above.

Information pertaining to the modified CCD 130 is then output by the dynamic modifier 110 to a platform adapter 404. The main tasks of the platform adapter 404 include the packing of application functions into individual deployment artifacts and the addition of libraries from a storage 406 to the resulting packages. The libraries provide artifact-internal and artifact-external function invocations as well as artifact-internal and artifact-external read and write accesses. The application function packages (i.e., the deployment artifacts) created by the platform adapter 404 are ready to be uploaded to the associated platform types (i.e., FaaS and FaaS). The platform adapter 404, or functions thereof, may also be integrated into the dynamic modifier 110.

Based on the deployment artifacts, the application model and the modified CCD 130, an application lifecyle manager 408 generates the required workflows (e.g., start, stop, install and uninstall workflows). The application lifecyle manager 408, or functions thereof, may also be integrated into the dynamic modifier 110.

The deployment artifacts, workflows, and so on are finally transferred to the runtime environment 402 so that the modified CCD 130 can be executed there. The process illustrated in FIG. 4 can iteratively be repeated in a dynamic manner. Each cycle may be triggered periodically (e.g., based on a timer), by a user input or in response to a measurement in the runtime environment 402 for the initial CCD 120 being indicative of violation of a performance target (defined, e.g., as a performance threshold), as will now be described in greater detail with reference to the flow diagram 500 of FIG. 5.

Figure 5:
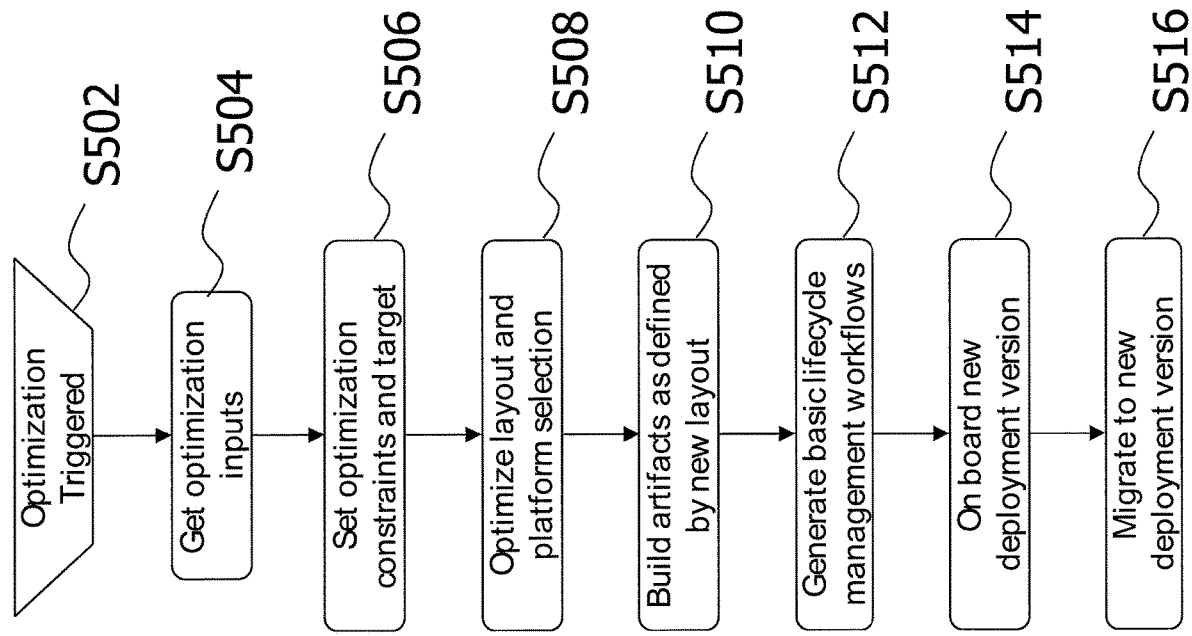
FIG. 5 is a flow diagram illustrating a further dynamic modification method embodiment of the present disclosure.

FIG. 5 illustrates the joint operation of the dynamic modifier 110, the platform adapter 404 and the application lifecycle manager 408 (as illustrated in FIG. 4) in the context of iteratively determining a modified CCD 130 for a serverless application presently deployed in the runtime environment 402. In the context of FIG. 5, the CCD modifications are performed for optimization execution of the serverless application in the runtime environment 402 by dynamically distributing its application functions across FaaS and CaaS platform types. The method illustrated in FIG. 5 builds upon the method discussed above with reference to FIG. 3.

A new optimization cycle for CCD modification is triggered in step S502 periodically, automatically in case a measurement yields that a performance threshold is exceeded, by a user/developer of the serverless application, or by a cloud provider. In some variants, the optimization cycles may run iteratively by deploying and measuring a series of generated CCD versions of the serverless application until oen or more requirements (e.g., the performance threshold) are met or after a predefined number of cycles. The term "version" refers to the CCD currently deployed in the runtime environment 402 and evaluated during the optimization cycle.

At the end of each cycle, a final "migrate to new deployment version" step S516 may be called manually by a user of the dynamic modifier 110 or automatically by an application manager component that is enabled by the user to trigger the migration step once a new version is on-boarded.

The optimization cycle starts in step S504 with obtaining various input parameters. Exemplary input parameter, some of which have already been discussed in the context of steps S302 and S304 of FIG. 3 above, are listed below:
1) An application model that contains the serverless application's execution workflow, lists externalized items of data for each function and indicates if a particular data item is accessed by several application functions (e.g., application functions $f_1$ to $f_6$ in the embodiment of FIG. 1). The application model may be given by user input, derived from program code analysis by the dynamic modifier 110 or (at least partly) derived from measurements in the runtime environment 402 for the currently deployed CCD.
2) Requirements in the form of application performance targets. Such targets may be obtained via user input. They include the following examples:
   Latency on critical path (e.g., as optimization constraint or optimization target for the later optimization procedure as set in step S506)
   Total cloud computing resources, or costs (as optimization constraint or optimization target as set in step S506)
   Function restoration requirements (as optimization constraint as set in step 506)
3) Requirements in the form of targets or constraints set by a platform operator of the targeted platform type on which the deployments artifact is to be deployed (i.e., FaaS and CaaS). An example for such a target is a set of cost function templates for the deployment artifacts.
4) Runtime measurements on function execution and data access statistics (per function and/or per platform). The scope of the measurements includes the current CCD/deployment version as well as any CCDs/deployment versions deployed and tested during previous optimization cycles. For example, such measurements may contain:
   Per function or function type: average function duration, function call rate and function inbound bandwidth, average rate/ratio of downstream invocations and bandwidth
   Per externalized data access (optionally per function or function type): average data access rate and bandwidth of read/write accesses
   Platform characteristics per platform: function invocations per function type (e.g., average duration of function invocation), data access per externalized data item per function type (e.g., average duration of read/write data access)
5) Hardware resource characteristics in the runtime environment 402, for example the number of processor cores, available memory, etc.
6) Software capabilities in the runtime environment, for example support of stateful library In a further step S508, the actual optimization procedure is performed to determine the modified CCD 130. During layout optimization for the modified CCD 130, the dynamic modifier 110 constructs the deployment layout of the serverless application that is expected to fulfill the optimization targets while none of the optimization constraints are violated (see step 506). The resulting layout for the modified CCD 130 comprises:
   A set of affinity rules for the application functions, which define how these functions are grouped into deployment artifacts;
   For each deployment artifact, a reference to the targeted platform type which shall run the artifact. Platform configurations are also added for function invocation;
   A list of externalized data items that shall be implemented externally to a particular deployment artifact. Externalized data items not included in the list can be implemented either externally or internally from the perspective of the particular artifact. Configurations for the selected externalization are also included.

In order to determine the CCD layout in step S508, an optimization function previously, namely in step S506, has derived a series of optimization constraints based on the obtained input parameters. It has also created a target function as a result of combining of the various optimization targets provided by the application developer (or owner) and the platform providers. These constraints and target function are used to evaluate the intermediate solutions found during the optimization process.

An exemplary implementation of the optimization function formulates the application model and the constraints as a series of equations and applies known equation solver algorithms to find a solution that fulfills the equations describing the constraints while minimizing an associated value of the target function. Once such a solution is found, the resulting CCD layout is output.

In another exemplary implementation, the optimization function generates a partial solution that fulfills the given requirements (e.g., optimization constraints and targets). The partial solution only considers a true subset of the application functions of a given serverless application). Then, the optimization function extends this partial solution with not-yet-added functions until the actual partial solution either violates any constraints or becomes a full solution. In the first case, the optimization function reduces the solution and tries other, not-yet-added functions. In the second case, it stores the found solution and reduces the solution again to find another possibly better solution. When a certain condition (number of extensions/reductions or number of found solutions) is met, the optimization function selects the best solution among the considered candidates as output for the modified/optimized CCD layout.

In a next step S510, the platform adapter 404 packages together application functions in the same affinity group (i.e., associated with the same deployment artifact). Moreover, the platform adapter 404 adds libraries to the deployment artifacts that provide artifact-internal or artifact-external function invocations as well as artifact-internal or artifact-external read/write data accesses to the package. The platform adapter 404 also binds API calls in regard to the invocations and data accesses in user functions to artifact-internal or external backends as defined by the modified/ optimized CCD layout (e.g., by modifying API calls in the user function before compiling them and linking them to the selected libraries). As a result of step S510, platform-specific deployment artifacts are ready to be uploaded in the runtime environment 402. For example, application functions to be deployed on a FaaS platform type may have been collected into tarballs (or similar data structures that permit the combination and, optionally, compression of multiple files, such as a .zip file). On the other hand, application functions to be deployed as containers on a CaaS platform type may have been compiled as Docker (or similar) images.

In a further step S514, basic lifecycle management workflows are generated by the lifecycle manager 408 based on the application model of the serverless application and the optimized CCD layout as determined in step S508, before the actual migration takes place in step S516. As such, step S514 generates an initialization function for each FaaS platform as well as install/uninstall workflows and start/stop workflows.

Figure 6:
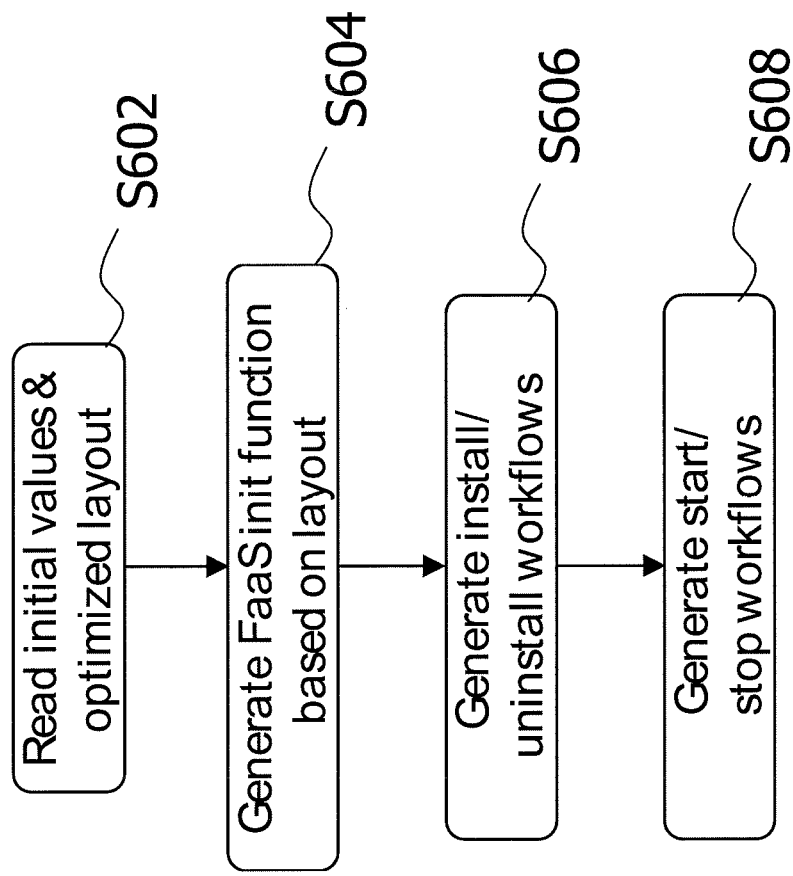
FIG. 6 is a flow diagram illustrating generation of basic lifecycle management workflows.

FIG. 6 illustrates in a flow diagram 600 a method embodiment of workflow generation. The method illustrated in FIG. 6 starts in step S602 with reading input parameters, including initial values for individual data items (as defined in the application model) and the optimized CCD layout. Then, based on the optimized CCD layout, the FaaS platform initialization function is generated in step S604. This function is responsible to initialize variables in data stores (as exemplarily illustrated for the initial CCD 120 and the modified/optimized CCD 130 in FIG. 1) and to configure function triggers (i.e., events that start a particular application function $f_1$ to $f_6$ in FIG. 1). Step S640 comprises the following sub-steps:
1) Configure triggers for all application functions implemented over FaaS based on the application model (for the modified/optimized CCD 130 in FIG. 1 only a trigger for application function $f_1$ would be triggered). Alternatively, FaaS function configuration could be implemented by the user code, in which case the related initialization function part is empty.
2) Initialize externalized data items in a distributed data store based on the initial values defined in the application model. The externalized data items that need to be implemented in a distributed data store are derived from the optimized CCD layout.

In a further step S606, the install and uninstall workflows are generated. The sub-steps required to generate the install workflow are listed below, while generating an uninstall workflow is straightforward. The install workflow generation steps comprise:
1) Add command to upload all functions that have been packaged in a deployment artifact for the FaaS platform type in step S510 to the actual FaaS platform.
2) Add command to upload the FaaS platform initialization function (as generated in step S604).
3) Create and store a context ID for the current deployment version of the serverless application. The context ID defines the FaaS platform domain name of the application functions that are deployed on a FaaS platform.
4) Add command to load container images that have been built in step S510 to a container image repository (e.g., a local docker repository)

Figure 7:
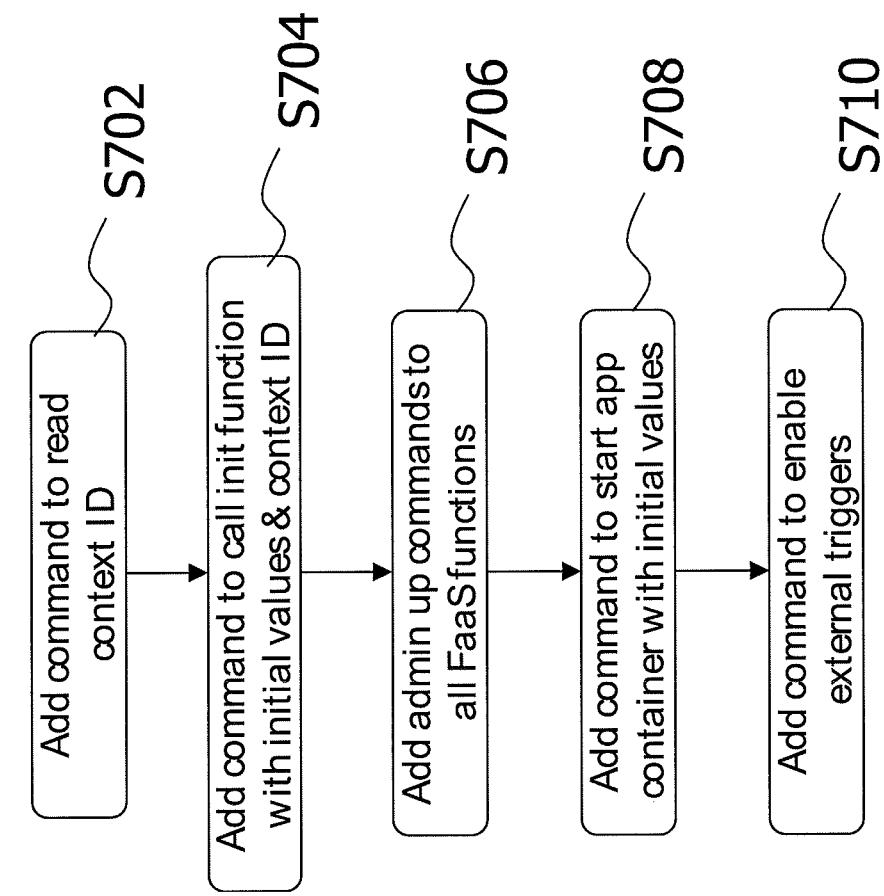
FIG. 7 is a flow diagram illustrating generation of a start workflow.

Then, in step S608, start and stop workflows are generated. The flow diagram 700 of FIG. 7 shows the steps required to generate a start workflow. The start workflow is typically executed by a lifecycle manager system (see reference numeral 408 in FIG. 4) or by a stand-alone program (e.g., a shell script). The stop workflow is straightforward. The term app container refers to the deployment option where application functions, selected by the optimized CCD layout of the current optimization cycle, are run in a container over a local library. The start workflow is put together as a series of commands in the following sequence:
1) Step S702: Add command to read context ID which identifies the application context on the FaaS platform
2) Step S704: Add command to execute initialization function of the FaaS platform. Once this step is finished, the FaaS platform part of the modified/optimized CCD of the serverless application is ready to be executed.
3) Step S706: Add command to run all application functions implemented over FaaS in admin state up (i.e., in an administrative state of a particular application function in which the function can be called and executed).
4) Step S708: Add command to run start CaaS-based container with initial values. These values are taken from the application model and filtered for external variables stored within the container.
5) Step S710: Add command to enable external (e.g., event-based) triggers for the application functions.

After these steps have been completed, the actual migration make take place in step S516. In the simplest implementation, the initial CCD 120 of the serverless application is stopped and the modified CCD 130 is started, using the corresponding stop and start workflows, respectively.

As has become apparent form the description of the above embodiments, optimized CCD layouts for serverless applications can be provided that improve application performance and/or reduce operational costs beyond the capabilities of existing optimization tools by optimizing across FaaS and CaaS platform types. Optimization and tuning during runtime provide a means for serverless application developers to control runtime characteristics by dynamically supplying application performance targets. Without optimization, application performance control is a complex task, because it depends on complex characteristics of underlying computing, network and storage hardware and software, which are largely abstracted from the developer.

Application performance also depends on the actual amount of data that needs to be moved across blades for running the application functions, which can also be taken into account in accordance with the present disclosure. Dynamic optimization ensures that a serverless application can dynamically adapt to changing hardware (e.g., when instantiated in a different edge of a distributed computing, DC, system) or to changing input characteristics, without the need of rewriting the program code. Also, dedicated cost models of FaaS and CaaS implementations can be taken into account in a requirement to optimize overall deployment costs of a serverless application.

It will be appreciated that the present disclosure has been described with reference to exemplary embodiments that may be varied in many aspects. As such, the present invention is only limited by the claims that follow.

The invention claimed is:
1. An apparatus for dynamically determining a modification of an initial cloud computing deployment (CCD) of a serverless application with multiple application functions, the multiple application functions in the initial CCD being grouped into one or more deployment artifacts, each deployment artifact comprising at least one application function, wherein each deployment artifact is associated with a dedicated cloud computing platform type selected from at least

Function as a Service (FaaS) and Container as a service (CaaS), the apparatus comprising:
   at least one processor; and
   a memory storing instructions, which when executed by the at least one processor, cause the apparatus to:
      obtain at least one requirement for the serverless application or deployment of the serverless application;
      obtain an application model of the serverless application;
      derive, on the basis of a true subset of the application functions, an intermediate CCD as a partial solution that fulfills the at least one requirement; and
      determine, based on the application model and the at least one requirement, a modified CCD of the serverless application by adding at least one of the application functions to the true subset such that the at least one requirement remains fulfilled, wherein the modified CCD comprises at least one of a modified grouping of the multiple application functions into one or more of the deployment artifacts and a modified association of a particular deployment artifact with a dedicated cloud computing platform type selected from at least FaaS and CaaS.

2. The apparatus of claim 1, wherein at least one of the initial CCD and the modified CCD comprises a first deployment artifact associated with the FaaS platform type and a second deployment artifact associated with the CaaS platform type.

3. The apparatus of claim 1, wherein the CaaS platform type comprises a container including a Platform as a Service (PaaS) artifact.

4. The apparatus of claim 1, wherein the instructions, when executed by the at least one processor, further cause the apparatus to obtain the application model by at least one of analyzing code of the serverless application and analyzing one or more measurements taken during runtime of the serverless application.

5. The apparatus of claim 1, wherein the application model defines at least one of: an execution workflow of the serverless application; and accesses of individual items of externalized data by individual application functions.

6. The apparatus of claim 5, wherein the items of externalized data are internal to a particular deployment artifact or external to a particular deployment artifact.

7. The apparatus of claim 5, wherein the modified CCD results in an association of deployment artifacts with externalized data that is different from that of the initial CCD.

8. The apparatus of claim 1, wherein the instructions, when executed by the at least one processor, further cause the apparatus to: express one or more of the application model and the at least one requirement as a set of equations; and determine the modified CCD using an equation solver algorithm.

9. The apparatus of claim 1, wherein the instructions, when executed by the at least one processor, further cause the apparatus to: obtain at least one measurement taken for the serverless application during runtime thereof in the initial CCD, determine the modified CCD based on or responsive to the at least one measurement; and obtain at least one of the requirement and the application model based on a processing of the at least one measurement.

10. The apparatus of claim 9, wherein the at least one measurement relates to one or more of: an execution of individual application functions; and an externalized data access by individual application functions or deployment artifacts.

11. The apparatus of claim 10, wherein the execution of the individual application functions is measured per function or per function type in regard to one or more of the following: function duration, function call rate, and function inbound bandwidth.

12. The apparatus of claim 10, wherein the externalized data access is measured per function, per function type, or per deployment artifact in regard to one or more of the following:
   data access rate, data access bandwidth, and data access duration.

13. The apparatus of claim 1, wherein the modified CCD is a reaction to at least one of a change in cloud computing hardware and a change in data input characteristics since creation of the initial CCD.

14. The apparatus of claim 1, wherein the at least one requirement relates to performance of the serverless application.

15. The apparatus of claim 14, wherein the performance is expressed by one or more of the following: critical path latency, a function restoration parameter, and total required hardware resources.

16. The apparatus of claim 1, wherein the instructions, when executed by the at least one processor, further cause the apparatus to perform at least one of the following operations: trigger installation of the modified cloud computing deployment; and generate a life cycle management workflow based on the application model and the modified CCD.

17. The apparatus of claim 1, wherein the instructions, when executed by the at least one processor, further cause the apparatus to: package a group of one or more of the application functions into a deployment artifact for the modified CCD; update one or more Application Programming Interface (API) calls associated with the application functions in that deployment artifact; and link the deployment artifact resulting from the packaging with one or more libraries that provide at least one of artifact-internal or artifact-external function invocations and artifact-internal or artifact-external data accesses.

18. A cloud computing system comprising: the apparatus of claim 1; and cloud computing resources configured for a deployment of the serverless application in accordance with at least one of the initial CCD and the modified CCD.

19. A method of dynamically determining a modification of an initial cloud computing deployment (CCD) of a serverless application with multiple application functions, the multiple application functions in the initial CCD being grouped into one or more deployment artifacts each comprising at least one application function, wherein each deployment artifact is associated with a dedicated cloud computing platform type selected from at least Function as a Service (FaaS) and Container as a service (CaaS), the method comprising:
   obtaining at least one requirement for the serverless application or deployment of the serverless application;
   obtaining an application model of the serverless application;
   deriving, on the basis of a true subset of the application functions, an intermediate CCD as a partial solution that fulfills the at least one requirement; and
   determining, based on the application model and the at least one requirement, a modified CCD of the serverless application by adding at least one of the application functions to the true subset such that the at least one requirement remains fulfilled, wherein the modified CCD comprises at least one of a modified grouping of the multiple application functions into one or more of the deployment artifacts and a modified association of a particular deployment artifact with a dedicated cloud computing platform type selected from at least FaaS and CaaS.

* * * * *